March 31, 1942.　　　A. SISCO　　　2,277,790
FISH LURE
Filed Sept. 28, 1940
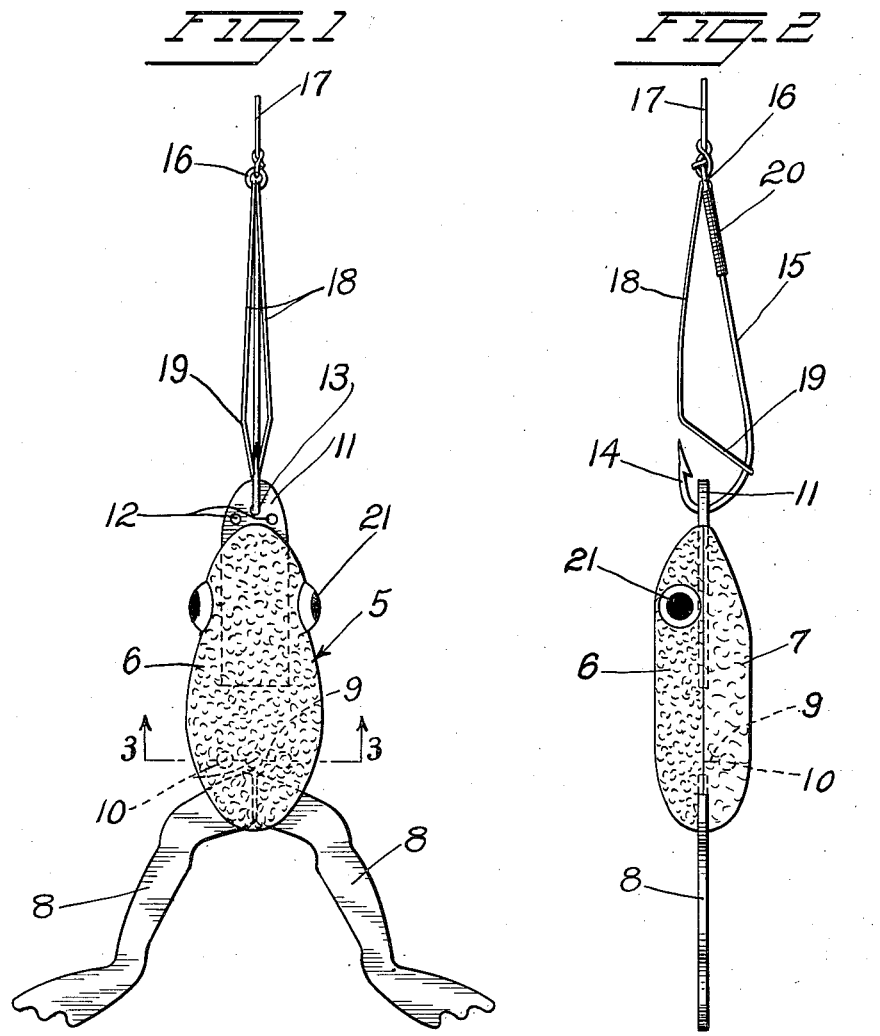
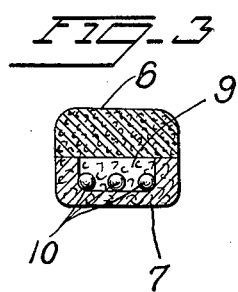
Inventor
Alexander Sisco.
By Lacey & Lacey, Attorneys Patented Mar. 31, 1942

2,277,790

UNITED STATES PATENT OFFICE 2,277,790

FISH LURE

Alexander Sisco, Kokomo, Ind.

Application September 28, 1940, Serial No. 358,919

9 Claims. (Cl. 43—42)

This invention relates to fish lures and more particularly to an artificial frog especially designed for use as a casting lure.

The object of the invention is to provide a fish lure constructed of sponge rubber and fashioned in simulation of a live frog so that, when making a casting or drawing the lure through the water, the bait will present an animated appearance and thus tempt the fish to take the same.

A further object of the invention is to provide a fish lure, the upper portion of which is impervious to moisture and the lower portion capable of absorbing moisture, said upper portion serving as a float and the lower portion to keep the lure submerged at the proper depth.

A further object is to provide the forward end of the lure with a flexible tongue of stretchable material for attachment to a fish hook so that, when the fish takes the bait, a pull exerted on the line will allow a limited forward movement of the hook and thus cause the hook to firmly impale the mouth of the fish.

A further object is to provide the rear portion of the lower section of the lure with a transverse slit or kerf adapted to receive lead shot or other ballast for holding said rear portion beneath the surface of the water.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a top plan view of a fish lure embodying the present invention.

Figure 2 is a side elevation, and

Figure 3 is a transverse sectional view taken on the line 3—3 of Figure 1.

The improved casting lure forming the subject-matter of the present invention comprises a body portion 5 preferably formed of sponge rubber and fashioned in simulation of a live frog, said body portion comprising upper and lower sections 6 and 7 having their confronting faces secured together by rubber cement or other suitable adhesive material.

The exterior surface of the upper portion 6 of the lure is coated with liquid Lotol so as to render the same impervious to moisture and thus act as a float while the lower portion 7 is devoid of such surface coating so as to absorb moisture and thus permit the lure to float on the water at the proper depth. Interposed between the portions 6 and 7 of the lure at the rear end thereof and secured thereto in any suitable manner are strips of rubber or other flexible material 8 fashioned to simulate the hind legs of a frog, and formed in the lower portion 7 adjacent the legs 8 is a transverse slot or kerf 9 into which are forced one or more B B shot 10 for the purpose of weighting down the rear end of the lure and causing the front end thereof to tilt upwardly at an angle to the surface of the water.

Disposed at the front end of the lure and interposed between and secured to the portions 6 and 7 thereof is a longitudinally disposed tongue 11 preferably formed of stretchable material, said tongue having its free end projected longitudinally beyond the forward end of the lure and provided with one or more openings 12. The openings 12 are preferably arranged in substantially triangular form, and extending through the central opening 13 is the bill 14 of a fish hook, indicated at 15. The shank of the hook 15 is provided with the usual eye 16 for attachment to a fishing line 17, and mounted on the shank 15 is a weed guard 18. The weed guard 18 is preferably formed of a single length of spring wire bent to form an inclined loop 19 which fits around the shank 15 adjacent the bill of the hook, the rear ends of the wire constituting the guard being secured to the shank of the hook by a binding strip 20. By pressing the spring wire constituting the weed guard towards the shank and securing the wire in different positions along said shank by the binding strip 20, the tension of the guard may be regulated at will. The upper portion 6 of the lure is formed with protruding portions 21 of a color contrasting to the color of said portion 6 and constituting the eyes of the frog.

When making a casting, the lure is drawn through the water at a slight angle to the surface thereof and, owing to the fact that the upper portion 6 is impervious to moisture, the air pockets in the sponge rubber will act as a float while water entering the air pockets of the lower portion 7 of the lure will keep said lure submerged at the proper depth. When the fish takes the bait and a longitudinal pull is exerted on the fishing line, the tongue 11 will stretch and thus permit the hook to move forwardly and firmly impale the mouth of the fish.

It will, of course, be understood that the lures may be made in different sizes and shapes and provided with one or more hooks without departing from the spirit of the invention.

Having thus described the invention, what is claimed as new is:

1. A fish lure comprising a sponge rubber body portion including upper and lower sections, one of which is impervious to moisture and the other capable of absorbing moisture, a tongue of stretchable material interposed between said sections at the front of the lure, and a fish hook engaging said tongue.

2. A fish lure comprising a sponge rubber body portion formed of upper and lower sections having their confronting faces secured together, the outer surface of the upper section being coated with a solution to render the same moisture-proof and the lower section being free to absorb moisture, a flexible tongue interposed between the body sections at the front of the lure and provided with an opening, and a fish hook extending through said opening for attachment to a fishing line.

3. A fish lure comprising a sponge rubber body portion fashioned in simulation of a frog and including upper and lower sections, the outer surface of the upper section being coated to render the same moisture-proof and the lower section being free to absorb moisture, flexible strips interposed between the body sections at the rear end thereof and fashioned to form the legs of a frog, a flexible tongue of stretchable material interposed between the body sections at the front of the lure, and a fish hook extending through the free end of said tongue for attachment to a fishing line.

4. A fish lure comprising a sponge rubber body portion fashioned in simulation of a frog and including upper and lower sections, the upper section having its surface coated to render the same moisture-proof and the lower section being free to absorb moisture, the lower section at the rear of the lure being provided with a transverse slit, weights within the slit and constituting ballast, a flexible tongue of stretchable material interposed between the body sections at the front end of the lure and provided at its free end with a plurality of openings, and a fish hook extending through one of said openings for attachment to a fishing line.

5. A fish lure comprising a sponge rubber body portion fashioned in simulation of a frog, the sponge rubber constituting the back of the frog being coated to render the same moisture-proof and the sponge rubber forming the belly of the frog being free to absorb moisture, a tongue extending longitudinally from the mouth of the frog, and a fish hook extending through said tongue for attachment to a fishing line.

6. A fish lure comprising a body portion fashioned in simulation of a live bait, a tongue secured to the forward end of the lure and having its free end provided with an opening, a fish hook having its bill extending through said opening and its shank provided with means for attachment to a fishing line, and a weed guard secured to the hook and provided with a terminal loop fitting around the shank of the hook adjacent the bill thereof.

7. A fish lure comprising a body portion including upper and lower sections, one of which is impervious to moisture and the other capable of absorbing moisture, a tongue extending longitudinally from the forward end of the body portion, and a fish hook engaging said tongue.

8. A fish lure comprising a body portion including upper and lower sections, one of which is impervious to moisture and the other capable of absorbing moisture, a tongue interposed between said sections at the front of the lure, and a fish hook engaging said tongue.

9. A fish lure comprising a body portion including upper and lower sections fashioned in simulation of a live bait, and a flexible tongue formed of a strip of stretchable material secured to the lure between said sections and having its free end provided with an opening adapted to receive the bill of a fish hook.

ALEXANDER SISCO.